(12) United States Patent
Misawa et al.

(10) Patent No.: US 6,453,122 B1
(45) Date of Patent: Sep. 17, 2002

(54) CAMERA CAPABLE OF BEING HELD STABLY

(75) Inventors: Atsushi Misawa, Saitama; Shoji Watanabe, deceased, late of Chiba, both of (JP), by Kinjiro Watanabe, Yone Watanabe, legal heir/representative

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/684,887

(22) Filed: Oct. 6, 2000

(30) Foreign Application Priority Data

Oct. 6, 1999 (JP) ............................................. 11-285295

(51) Int. Cl.$^7$ ........................ G03B 17/00; G03B 17/02; G03B 29/00; H04N 9/47; H04N 5/225
(52) U.S. Cl. ........................ 396/36; 396/299; 396/535; 396/429; 348/64; 348/376; 358/909.1
(58) Field of Search ............................... 396/30, 31, 33, 396/36, 263, 299, 535, 429; 358/906, 909.1; 348/64, 373, 376, 333.06, 333.08

(56) References Cited

U.S. PATENT DOCUMENTS

| | | | | |
|---|---|---|---|---|
| 5,442,453 A | * | 8/1995 | Takagi et al. | 358/335 |
| 5,657,084 A | * | 8/1997 | Kurokawa et al. | 348/373 |
| D392,659 S | * | 3/1998 | Takano | D16/202 |
| 5,946,031 A | * | 8/1999 | Douglas | 348/207 |

* cited by examiner

*Primary Examiner*—David M. Gray
*Assistant Examiner*—Rochelle Blackman
(74) *Attorney, Agent, or Firm*—Sughrue Mion, PLLC

(57) ABSTRACT

A camera has a camera body. A taking lens is disposed at a front face of the camera body, for introducing object light. A grip portion is disposed in the camera body and lower than the taking lens, and adapted to holding of the camera body. A release button is adapted for recording the object light from the taking lens by being depressed, and is disposed between the taking lens and the grip portion. In a preferred embodiment, the release button has a depression surface inclined with reference to the front face of the camera body. Furthermore, an instant photo film chamber is formed in the camera body, disposed behind a central portion of the front face, and contains an instant photo film. A printer unit with an exposure head records an image to the instant photo film.

20 Claims, 3 Drawing Sheets

CAMERA CAPABLE OF BEING HELD STABLY

BACKGROUND OF THE INVENTION

1. Field of the Invention

The present invention relates to a camera, and more particularly, relates to a camera capable of being held stably by means of appropriate arrangement of elements.

2. Description Related to the Prior Art

There are various available types of instant photo film packs, which include a case with a small thickness and a mono-sheet type of plural instant photo films of a stack accommodated in the case. The instant photo film pack is for use with an instant camera, a printer, an electronic still camera with a printer incorporated therein. There is a pack chamber formed in such a device, for being loaded with the instant photo film pack to take exposures. A lid openably closes the pack chamber in a light-tight manner.

An exposure opening is formed in a front wall of the case of the instant photo film pack for providing an exposure to an exposure surface of the instant photo film. Pad access openings are formed in a rear wall of the case. When the lid is closed, pads secured to an inner face of the lid are inserted in the pad access openings. A plate spring is secured to close the pad access openings. The pads push the rear of the stack of the instant photo films in contact with the plate spring. A first one of the instant photo films being pushed is pressed against an edge of the exposure opening, and kept flat. In a camera or printer with the pads disposed on the lid, the instant photo film pack is inserted in the pack chamber in a direction of advancing its front face. An open area of the pack chamber is larger than an area of the front wall of the instant photo film pack. Also, an area of the lid is larger than an area of the front wall of the instant photo film pack.

In the electronic still camera for use with the instant photo film pack, the lid and the opening for the pack chamber are disposed in the front or rear. Portions about the pack chamber are used for disposing the taking lens, the release button, the viewfinder, and a grip for camera holding.

An example of the electronic still camera of the printer-incorporated type includes the pack chamber disposed directly behind a front wall, and the taking lens and grip arranged vertically beside the pack chamber. However, this type has a shortcoming in that a release button on the upside causes failure in reaching a finger for the release button from the grip due to a considerable distance between the release button and grip. Unwanted interference of the finger with the object light path is typically likely to occur. Holding of the pack chamber is considerably unstable. It is difficult to hold the electronic still camera of the printer-incorporated type reliably, the type being greater than a widely used photographic camera.

SUMMARY OF THE INVENTION

In view of the foregoing problems, an object of the present invention is to provide a camera capable of being held stably by means of appropriate arrangement of elements.

In order to achieve the above and other objects and advantages of this invention, a camera includes a camera body. A taking lens is disposed at a front face of the camera body, for introducing object light. A grip portion is disposed in the camera body and lower or higher than the taking lens, and adapted to holding of the camera body. A release button is adapted to recording the object light from the taking lens by being depressed, and disposed between the taking lens and the grip portion.

The taking lens, the grip portion and the release button are arranged along one vertically extending lateral edge of the front face of the camera body.

The release button is disposed lower than the taking lens, and higher than the grip portion.

The camera is an electronic still camera, and comprises an image sensor for photographing the object light. An image processor retrieves a signal from the image sensor in response to operation of the release button, in order to write information of an object image to a memory.

The release button has a depression surface inclined with reference to the front face of the camera body.

Furthermore, a lens barrel is disposed about the taking lens, for constituting a portion of the front face in the camera body. The grip portion is disposed to extend forwards with reference to the lens barrel.

Furthermore, a recording material chamber is formed in the camera body, disposed behind a central portion of the front face, for containing recording material. A printer unit records an image to the recording material.

Furthermore, a lid member constitutes a portion of the front face of the camera body, and openably closes the recording material chamber, the lid member having at least one portion adapted to holding of the camera body with the grip portion.

Furthermore, a retreating or projecting pattern has plural recesses and/or plural projections, is formed in a portion of the lid member close to the grip portion, and is adapted to preventing slips in holding of the camera body.

Furthermore, a mode selector selectively generates at least a photographing mode signal and a printing mode signal. A controller is connected with the mode selector, for causing the image processor to operate in response to operation of the release button while the photographing mode signal is generated, and for causing the printer unit to operate according to information of one image in response to a print starting input while the printing mode signal is generated.

Furthermore, an externally observable display panel is provided. The controller, while the photographing mode signal is generated, causes the display panel to indicate the object image according to a signal from the image sensor, and when the printing mode signal is generated upon discontinuing generation of the photographing mode signal, causes the printer unit to operate according to the information of the object image.

The mode selector and the display panel are disposed at a rear face of the camera body.

The recording material is an instant photo film, and the printer unit includes an exposure head.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
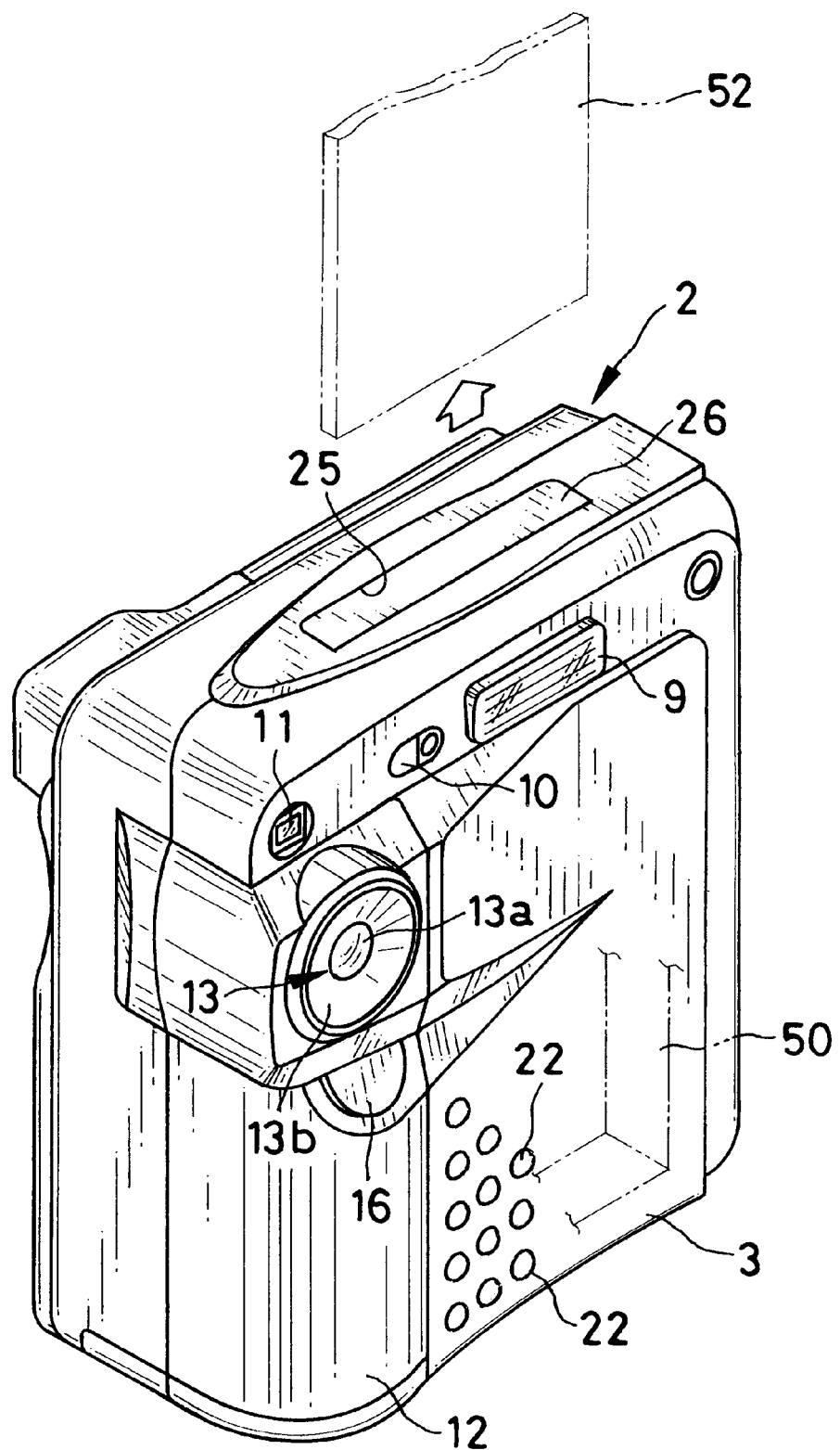
FIG. 1 is a perspective illustrating an electronic still camera of the invention as viewed from the front, with an instant photo film.
Figure 2:
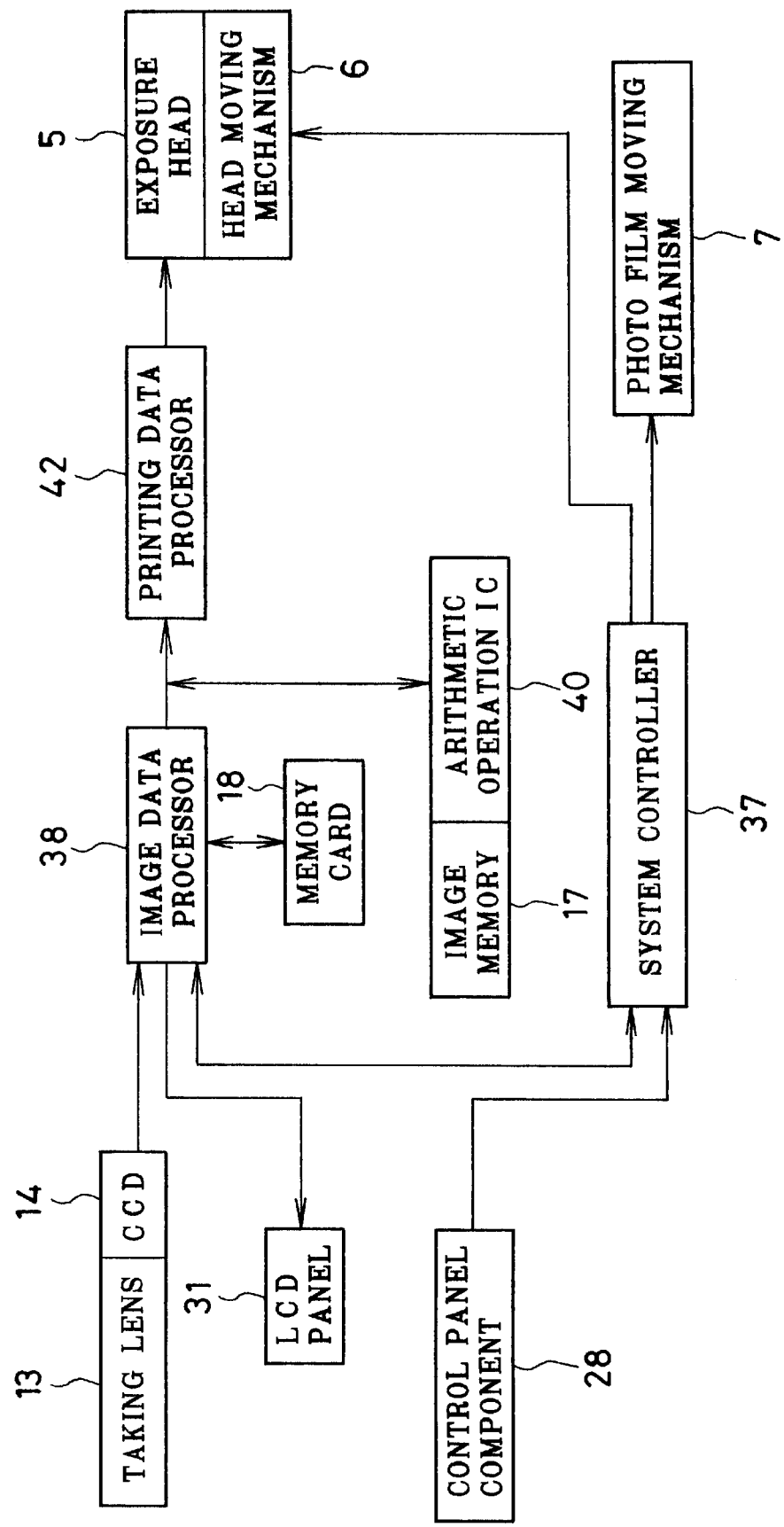
FIG. 2 is a block diagram illustrating arrangement of circuits of the electronic still camera.

In FIGS. 1 and 2, an electronic still camera 2 of a printer-incorporated type is illustrated. An instant photo film chamber 50 is formed inside the electronic still camera 2 and disposed in the center, and receives an instant photo film pack set therein. A lid 3 openably closes the instant photo film chamber 50, and has a lower edge supported in a rotatable manner. Instant photo films 52 in the photo film pack are positioned in the instant photo film chamber 50. There are pad members disposed on an inside of the lid 3, for pushing a surface of the instant photo films 52 through openings formed in the photo film pack while the lid 3 is closed.

In the instant photo film chamber 50 are disposed an exposure head 5, a head moving mechanism 6 and a photo film moving mechanism 7, the exposure head 5 being included in a printer unit. The exposure head 5 is opposed to an exposure surface of the instant photo film 52, and applies printing light of red, green and blue colors to the instant photo film 52 for providing an exposure. The head moving mechanism 6 moves the exposure head 5 at a constant speed, and moves the exposure head 5 to all portions of the exposure surface of the instant photo film 52. The photo film moving mechanism 7 is a combination of elements including a pair of spreader rollers, a claw plate and the like all known in the field of the instant camera. After the instant photo film 52 is exposed, the claw plate advances the instant photo film 52 from the photo film pack. The spreader rollers rotate in squeezing the instant photo film 52, to eject the instant photo film 52 and process an image.

The electronic still camera 2 has a flash device 9, a light adjusting sensor 10 and a viewfinder objective window 11 disposed higher than the lid 3. The flash device 9 emits flash light to a photographic field. A grip portion 12 is disposed beside the lid 3 and adapted to holding the electronic still camera 2. A taking lens 13 is disposed above the grip portion 12. There are a shutter mechanism and diaphragm mechanism disposed behind from the taking lens 13. Also, a CCD 14 as an image sensor is disposed behind the shutter mechanism and diaphragm mechanism, and constitutes a focal plane on which object light is focused by the taking lens 13.

Note that the taking lens 13 includes an optical lens 13a and lens barrel 13b. A front edge of the lens barrel 13b is so disposed that the grip portion 12 extends forwards from the front edge of the lens barrel 13b.

Figure 3:
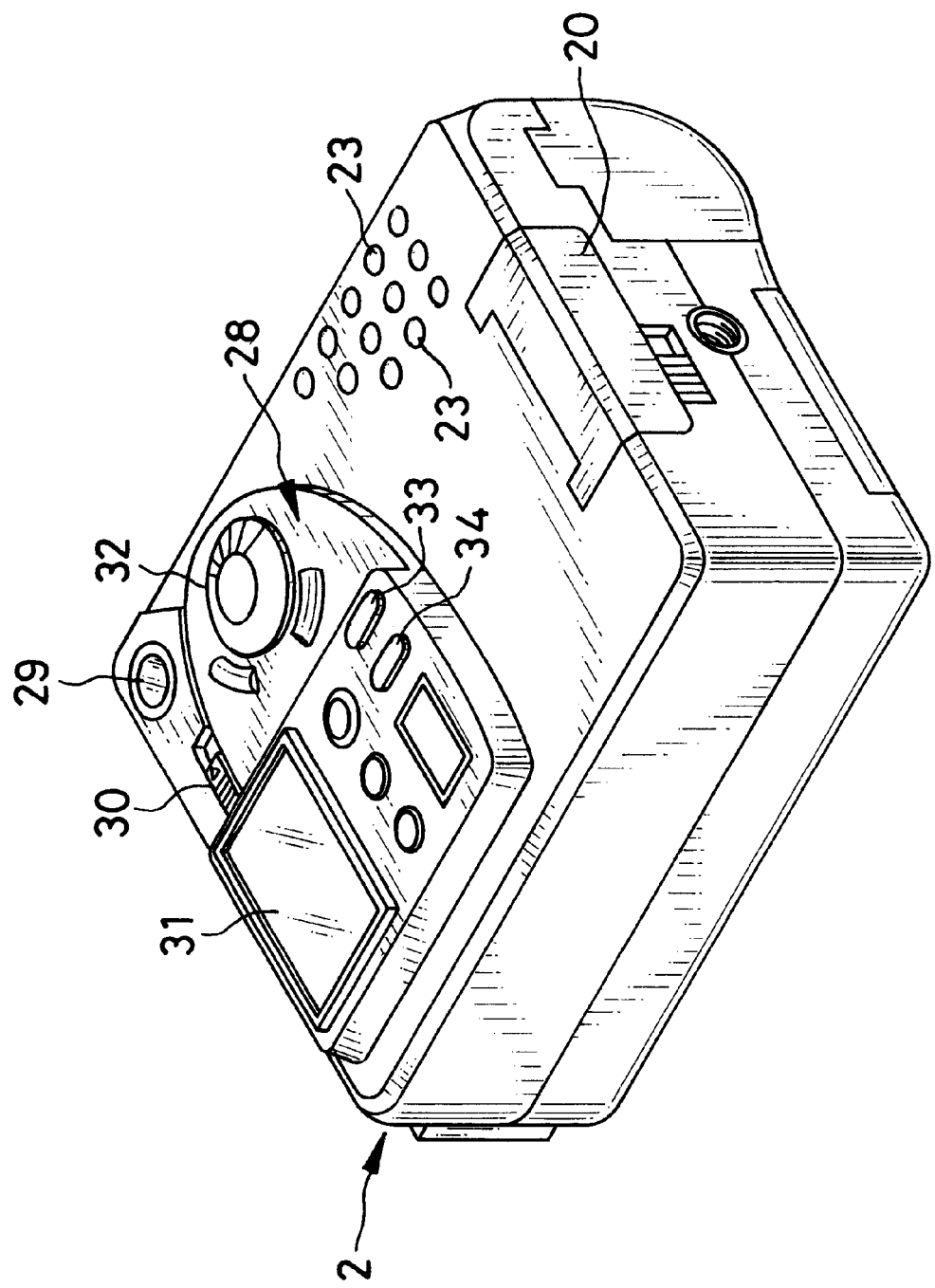
FIG. 3 is a perspective illustrating the electronic still camera as viewed from the rear.

A release button 16 is disposed between the taking lens 13 and grip portion 12. When the release button 16 is operated, object light from a photographic object, which is focused on a surface of the CCD 14, is retrieved as image data, which is written to an image memory 17 or memory card 18. The image memory 17 is incorporated in the electronic still camera 2, and stores image data in a special-purpose form specialized for internal processing of data. As illustrated in FIG. 3, the memory card 18 is an additional unit of storage, is set in a memory card slot (not shown) covered by a slot cover 20, and stores image data in a general-purpose form usable in a personal computer, printer or the like.

The release button 16 is disposed close to the grip portion 12, and also inclined in such a manner that an index finger of a user's right hand can easily depress it in grasping the grip portion 12. Even if the hand is considerably small, he or she can reach the index finger for the release button 16 while the grip portion 12 is grasped firmly.

A pattern of plural recesses 22 is formed in a surface of the lid 3 and near to a lower portion of the grip portion 12. The recess pattern 22 is used together with the grip portion 12 for holding the electronic still camera 2. If a user has a large hand or long fingers, he or she can hold the electronic still camera 2 by supporting the recess pattern 22 with the fingers without slipping even when the grip portion 12 is considerably small in comparison with the fingers. In FIG. 3, a pattern of recesses 23 is formed in a rear surface of the electronic still camera 2. In order to prevent slipping of fingers on the lid 3 or the rear of the electronic still camera 2, it is possible to use projections, grooves, ridges and the like in addition to the recess pattern 22.

An exit slot 25 is formed on the upside of the electronic still camera 2, and adapted for ejection of the exposed instant photo film 52 from the electronic still camera 2 after printing. A door 26 closes the exit slot 25 in a light-tight manner when in a free state. When the instant photo film 52 advances to exit from the electronic still camera 2, the door 26 is pushed open by the instant photo film 52.

When in a photographing mode, the electronic still camera 2 is used in an erectly oriented state of FIG. 1. When in a reproducing mode or printing mode, the electronic still camera 2 is used in a state laid with its front oriented downwards as illustrated in FIG. 3. Thus, the electronic still camera 2 can operate for all operations related to the printing in the stably laid state.

A control panel component 28 is disposed on the rear of the electronic still camera 2 held in a normal orientation, and includes various pushbutton for operation. The control panel component 28 includes a viewfinder eyepiece window 29, a power switch 30, a liquid crystal display (LCD) panel 31, a cursor button 32, a mode selector button 33 and a printing start button 34. The LCD panel 31 constitutes an electronic viewfinder, and also reproduces image data read from the image memory 17 or memory card 18. The cursor button 32 operates for digital zooming, and also cooperates with the mode selector button 33 to select various operations in the photographing and reproducing modes, and to select frames to be printed. When the printing start button 34 is depressed, printing of an image indicated in the LCD panel 31 is started.

In FIG. 2, a system controller 37 is incorporated in the electronic still camera 2 for controlling various elements, and includes a CPU, program ROM, data RAM and the like. Object light focused on the CCD 14 is photoelectrically converted by the CCD 14 and input to an image data processor 38. The image data processor 38 controls the CCD 14, converts the photoelectrical input to an NTSC signal, which is input to the LCD panel 31. The LCD panel 31 continuously indicates the image focused on the CCD 14, and is used as a viewfinder.

Upon depression of the release button 16, the image data processor 38 converts the image to special-purpose image data, the image being focused on the CCD 14 at the time of the depression. An arithmetic operation IC 40 is supplied with the special-purpose image data, and writes the same to the image memory 17. If the memory card 18 is designated for image recording, the special-purpose image data is converted by the arithmetic operation IC 40 to general-purpose image data, which is written to the memory card 18 by means of the image data processor 38 as interface.

When the printing start button 34 in the control panel component 28 is operated, the arithmetic operation IC 40 converts the special-purpose image data to printing data, which is input to a printing data processor 42. The printing data processor 42 separates the printing data into color data of the three primary colors, separates the color data into line data, which are input to the exposure head 5 by the unit of gradation.

Operation of the above embodiment is described now. When a power source in the electronic still camera 2 is turned on by operating the power switch 30, the photographing mode is set automatically. A user grasps the grip portion 12 with his or her right hand and holds the electronic still camera 2. The release button 16 is considerably close to the grip portion 12 and has an inclination for facilitating a reach of the index finger of the right hand. Thus, the electronic still camera 2 can be held stably even by a small hand. Note that, if the right hand is considerably large in comparison with the size of the grip portion 12, fingers may not tightly contact the grip portion 12. However, tips of the fingers can reach and support the recess pattern 22 in the lower portion of the lid 3. This is effective in tightly holding the electronic still camera 2 with the right hand.

The user frames a photographic field by directing the taking lens 13 thereto. It is possible for him or her to select one of an optical viewfinder and an electronic viewfinder. In the case of the latter, the LCD panel 31 is used to indicate an image. The object light focused on the CCD 14 after passage through the taking lens 13 is converted by the image data processor 38 into an NTSC signal, which is input to the LCD panel 31. The LCD panel 31 continuously indicates the image focused on the CCD 14.

The user frames the photographic field by observation through the LCD panel 31. The release button 16 is depressed. An image photographed by the CCD 14 is converted by the image data processor 38 into special-purpose image data.

Note that writing of image data to which of the image memory 17 and memory card 18 is previously determined, for example, by operating various buttons included in the control panel component 28. If the image memory 17 is designated for image recording, the special-purpose image data converted by the image data processor 38 is subjected to calculation in the arithmetic operation IC 40 and written to the image memory 17. If the memory card 18 is designated for image recording, the special-purpose image data is converted by the arithmetic operation IC 40 into general-purpose image data for writing to the memory card 18 by means of the image data processor 38.

For a printing operation, the electronic still camera 2 is placed in an orientation depicted in FIG. 3 by directing the lid 3 downwards. Then the mode selector button 33 is operated to set the electronic still camera 2 in the printing mode. The cursor button 32 and other buttons are operated to cause the LCD panel 31 to indicate image of the image data read from the image memory 17 or memory card 18. The image data from the image memory 17 or memory card 18 are converted by the image data processor 38 into an NTSC signal, to cause the LCD panel 31 to indicate an image.

When an image to be printed is determined, the printing start button 34 is depressed while the image is indicated in the LCD panel 31. The arithmetic operation IC 40 produces the printing data according to image data of the image. The printing data is input to the printing data processor 42.

The printing data processor 42 produces head-driving printing data according to printing data input from the arithmetic operation IC 40. The exposure head 5 emits light according to the head driving printing data, to expose one line in the exposure surface of the instant photo film 52. The system controller 37 actuates the head moving mechanism 6 to move the exposure head 5. In this manner, the entirety of the exposure surface is exposed.

When the exposure to the instant photo film 52 is completed, the system controller 37 actuates the photo film moving mechanism 7. The claw plate advances the exposed one of the instant photo films 52 from out of the photo film pack, for the spreader rollers to squeeze the same. The spreader rollers spread developing solution on the exposure surface.

The instant photo film 52 advanced by the spreader rollers pushes open the door 26, and is ejected to the outside.

Outside the electronic still camera 2, processing of the instant photo film 52 is completed at a lapse of a sufficient time. A positive image is formed on an image forming surface, which is reverse to the exposure surface. As the grip portion 12 can be held stably, and the release button 16 is easy to handle, occurrence of camera shakes is reduced. Thus, the instant photo film 52 can be exposed at a high quality.

Note that the camera of the above embodiment is the electronic still camera 2. However, a camera according to the invention may be a photographic camera, a video movie camera and other optical instruments.

In the above embodiment, the printer unit includes the exposure head 5 to record an image photographically to the instant photo film 52. However, recording material may be any photo film, thermal processing photosensitive material or the like. Furthermore, any recording system may be used for recording an image to recording material, for example may be thermal recording by use of a thermal head.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A camera comprising:
   a camera body having a front face;
   a taking lens, disposed at said front face of said camera body, for introduction of light from an object therein;
   a grip portion disposed integrally with said camera body in a position that is one of lower and higher than said taking lens, said grip portion for holding of said camera body; and
   a release button adapted to effect recording an image of said object through said taking lens by being depressed, said release button being disposed between said taking lens and said grip portion, said release button having a depression surface inclined with reference to said front face of said camera body;
   wherein said taking lens and said release button are disposed on a vertical straight line that passes a center of said grip portion.

2. A camera as defined in claim 1, wherein said grip portion is disposed lower than said taking lens.

3. A camera as defined in claim 2, wherein said taking lens, said grip portion and said release button are arranged along one vertically extending lateral edge of said front face of said camera body.

4. A camera as defined in claim 3, further comprising:
   an image sensor for photographing said object; and
   an image processor for retrieving a signal from said image sensor in response to depression of said release button, in order to write information of an object image to a memory.

5. A camera as defined in claim 1, wherein said taking lens includes an optical lens and a lens barrel for supporting said optical lens;
   and wherein said grip portion is disposed to extend forward with reference to said lens barrel.

6. A camera as defined in claim 1, wherein said grip portion comprises an inclined surface that is parallel with said depression surface of said release button.

7. A camera comprising:
   a camera body;
   a taking lens, disposed at a front face of said camera body, for introduction of light from an object therein;

a grip portion disposed integrally with said camera body in a position that is lower than said taking lens, said grip portion adapted for holding of said camera body;

a release button adapted to effect recording an image of said object through said taking lens by being depressed, said release button being disposed between said taking lens and said grip portion;

an image sensor for photographing said object;

an image processor for retrieving a signal from said image sensor in response to depression of said release button, in order to write information of an object image to a memory;

a recording material chamber, formed in a center of said camera body, for containing recording material;

a lid member for closing said recording material chamber in a manner openable to a front, said lid member having at least one portion adapted for holding of said camera body with said grip portion; and a printer unit for recording an image to said recording material;

wherein said taking lens, said grip portion and said release button are arranged along one vertically extending lateral edge of said front face of said camera body; and wherein said taking lens and said release button are disposed on a vertical straight line that passes a center of said grip portion.

8. A camera as defined in claim 7, further comprising a retreating or projecting pattern having at least one of plural recesses and plural projections, said retreating or projecting pattern being formed in a portion of said lid member close to said grip portion, and adapted for preventing slipping when holding said camera body.

9. A camera as defined in claim 7, further comprising:

a mode selector for selectively generating at least a photographing mode signal and a printing mode signal;

a controller, connected with said mode selector, for causing said image processor to operate in response to depression of said release button while said photographing mode signal is generated, and for causing said printer unit to operate according to information of one image in response to a print starting input while said printing mode signal is generated.

10. A camera as defined in claim 9, further comprising an externally observable display panel;

wherein said controller, while said photographing mode signal is generated, causes said display panel to indicate said object image according to a signal from said image sensor, and when said printing mode signal is generated upon discontinuing generation of said photographing mode signal, causes said printer unit to operate according to said information of said object image.

11. A camera as defined in claim 10, wherein said mode selector and said display panel are disposed at a rear face of said camera body.

12. A camera as defined in claim 7, wherein said recording material is an instant photo film, and said printer unit includes an exposure head.

13. A camera comprising:

a camera body;

a taking lens, disposed at a front face of said camera body, for introduction of light from an object therein;

a grip portion disposed integrally with said camera body in a position that is lower than said taking lens, said grip portion adapted for holding of said camera body;

a release button adapted to effect recording an image of said object through said taking lens by being depressed, said release button being disposed between said taking lens and said grip portion;

a recording material chamber, formed in a center of said camera body, for containing recording material; and a printer unit for recording an image to said recording material;

wherein said taking lens and said release button are disposed on a vertical straight line that passes a center of said grip portion.

14. A camera as defined in claim 13, further comprising a lid member for opening or closing said recording material chamber in a manner openable to said front face, said lid member having at least one portion adapted for holding of said camera body with said grip portion.

15. A camera as defined in claim 13, further comprising a retreating or projecting pattern having at least one of plural recesses and plural projections, said retreating or projecting pattern being formed in a portion of said lid member close to said grip portion, and being adapted for preventing slipping when holding said camera body.

16. A camera as defined in claim 15, further comprising:

an image sensor for photographing said object;

an image processor for retrieving a signal from said image sensor in response to depression of said release button, in order to write information of an object image to a memory;

a mode selector for selectively generating at least a photographing mode signal and a printing mode signal;

a controller, connected with said mode selector, for causing said image processor to operate in response to depression of said release button while said photographing mode signal is generated, and for causing said printer unit to operate according to information of one image in response to a print starting input while said printing mode signal is generated.

17. A camera as defined in claim 16, further comprising an externally observable display panel;

wherein said controller, while said photographing mode signal is generated, causes said display panel to indicate said object image according to a signal from said image sensor, and when said printing mode signal is generated upon discontinuing generation of said photographing mode signal, causes said printer unit to operate according to said information of said object image.

18. A camera as defined in claim 17, wherein said mode selector and said display panel are disposed at a rear face of said camera body.

19. A camera as defined in claim 13, wherein said recording material is an instant photo film, and said printer unit includes an exposure head that moves during exposure.

20. A camera comprising:

a camera body having a front face;

a viewfinder objective window disposed at said front face;

a taking lens, disposed at said front face and located entirely beneath said viewfinder objective window, for introduction of light from an object therein;

a grip portion disposed integrally with said camera body in a position that is one of lower and higher than said taking lens, said grip portion for holding of said camera body;

a release button adapted to effect recording an image of said object through said taking lens by being depressed, said release button being disposed between said taking lens and said grip portion, said release button having a depression surface inclined with reference to said front face of said camera body; and a recording material which is an instant photo film, and a printer unit with an exposure head that moves during exposure.

* * * * *